United States Patent [19]
Thorley et al.

[11] Patent Number: 4,556,128
[45] Date of Patent: Dec. 3, 1985

[54] WHEELCHAIR LIFT

[75] Inventors: Graham R. Thorley, La Mesa; Donald B. Sullivan, San Diego, both of Calif.

[73] Assignee: Lift-U-Inc., Kent, Wash.

[21] Appl. No.: 423,930

[22] Filed: Sep. 27, 1982

Related U.S. Application Data

[60] Division of Ser. No. 268,466, May 29, 1981, which is a continuation-in-part of Ser. No. 41,943, May 24, 1979, Pat. No. 4,251,179, which is a continuation-in-part of Ser. No. 885,714, Mar. 13, 1978, Pat. No. 4,176,999, which is a continuation-in-part of Ser. No. 769,636, Feb. 17, 1977, Pat. No. 4,081,091, which is a continuation-in-part of Ser. No. 606,137, Aug. 20, 1975, Pat. No. 4,027,807.

[51] Int. Cl.⁴ .............................................. B66B 9/20
[52] U.S. Cl. .................................... 187/9 R; 414/540; 414/921; 105/447; 280/166
[58] Field of Search ................... 182/9 R, 8.59, 8.52; 414/540, 541, 545, 921; 105/443, 445, 447, 448, 430, 431, 435; 280/163, 166; 254/124

[56] References Cited

U.S. PATENT DOCUMENTS 2,040,866  9/1980  Robinson ............................ 414/543
4,180,366  12/1979  Roth et al. ......................... 414/540
4,270,630  6/1981  Karkau ............................... 414/545

Primary Examiner—Joseph J. Rolla
Assistant Examiner—Kenneth Noland
Attorney, Agent, or Firm—Charmasson & Holz

[57] ABSTRACT

The latest in a series of wheelchair lift improvements is provided, the basic lift structure on which the improvements are made being the type utilizing a step configuration, the individual panels of which, being hinged together, are simply extended into a geometrical plane rather than a step structure. The resulting platform is then elevationally adjusted by the driver to commute the platform, and a wheelchair victim on the platform, between the curb and bus floor level. The improvements include the hydraulic drive for deploying the mechanism between step and platform mode, the safety barrier structure which defines an extension of the platform to the curb level when it is dropped from its safety barrier mode, a safety locking mechanism and a stablizing chain.

6 Claims, 13 Drawing Figures

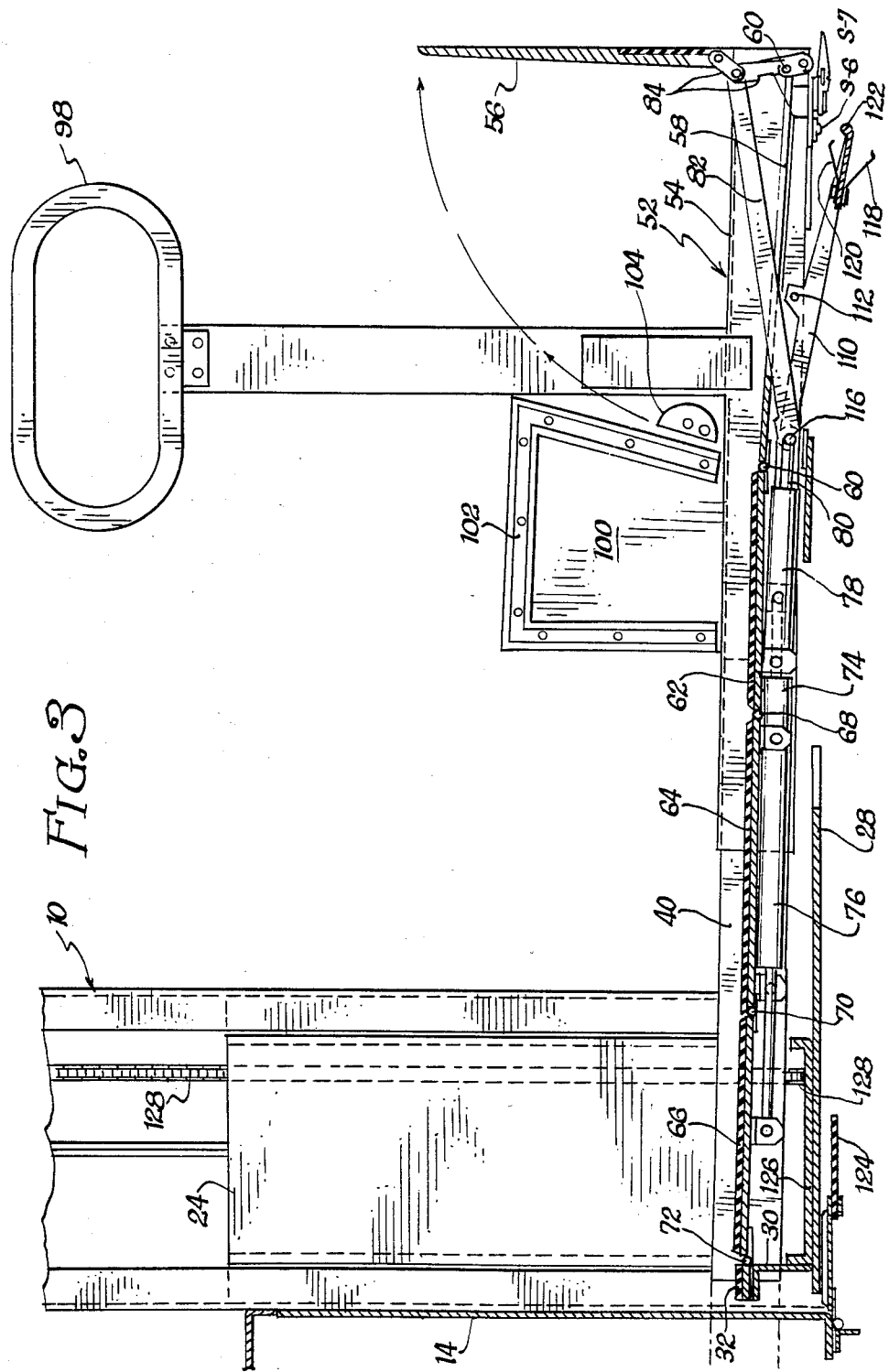

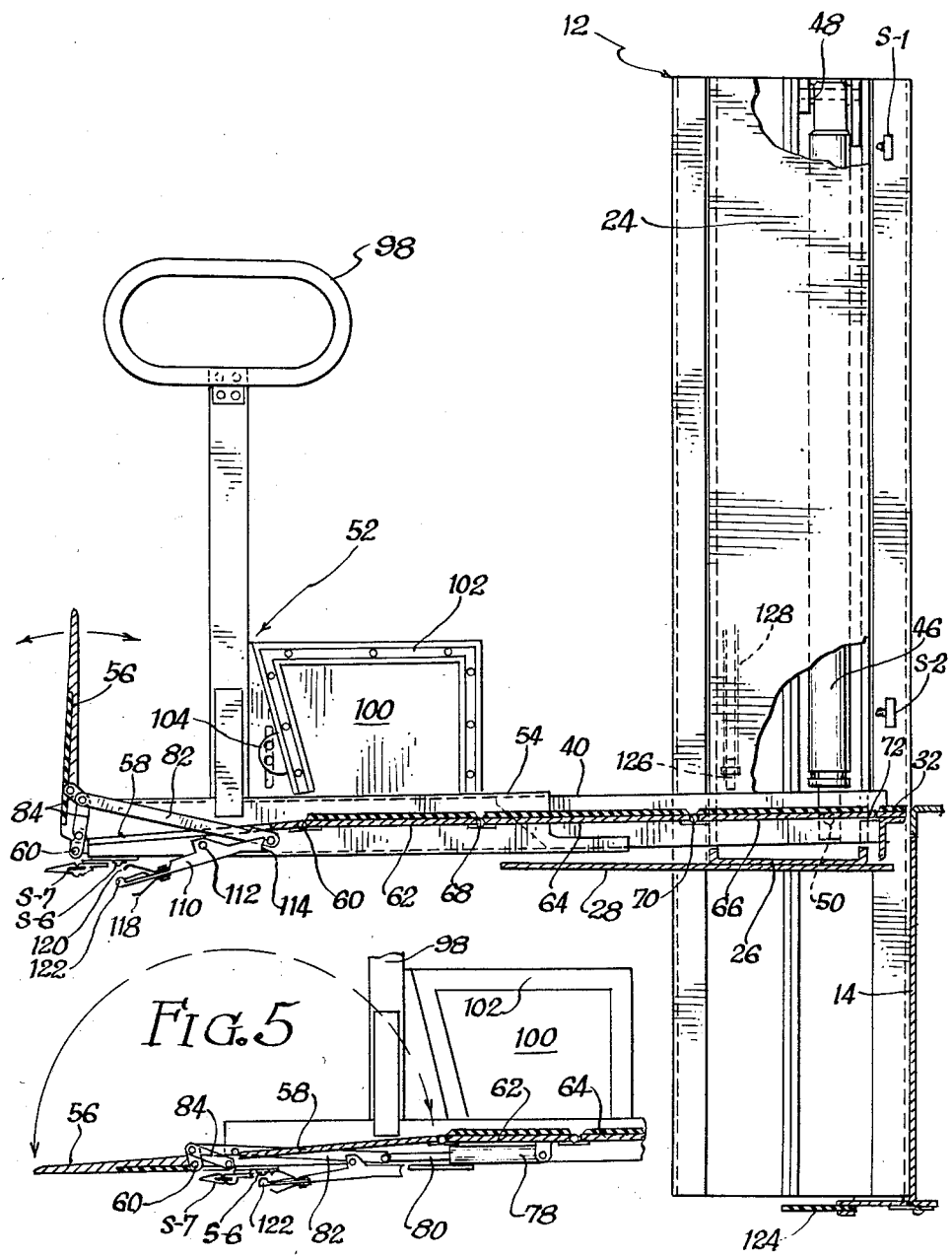

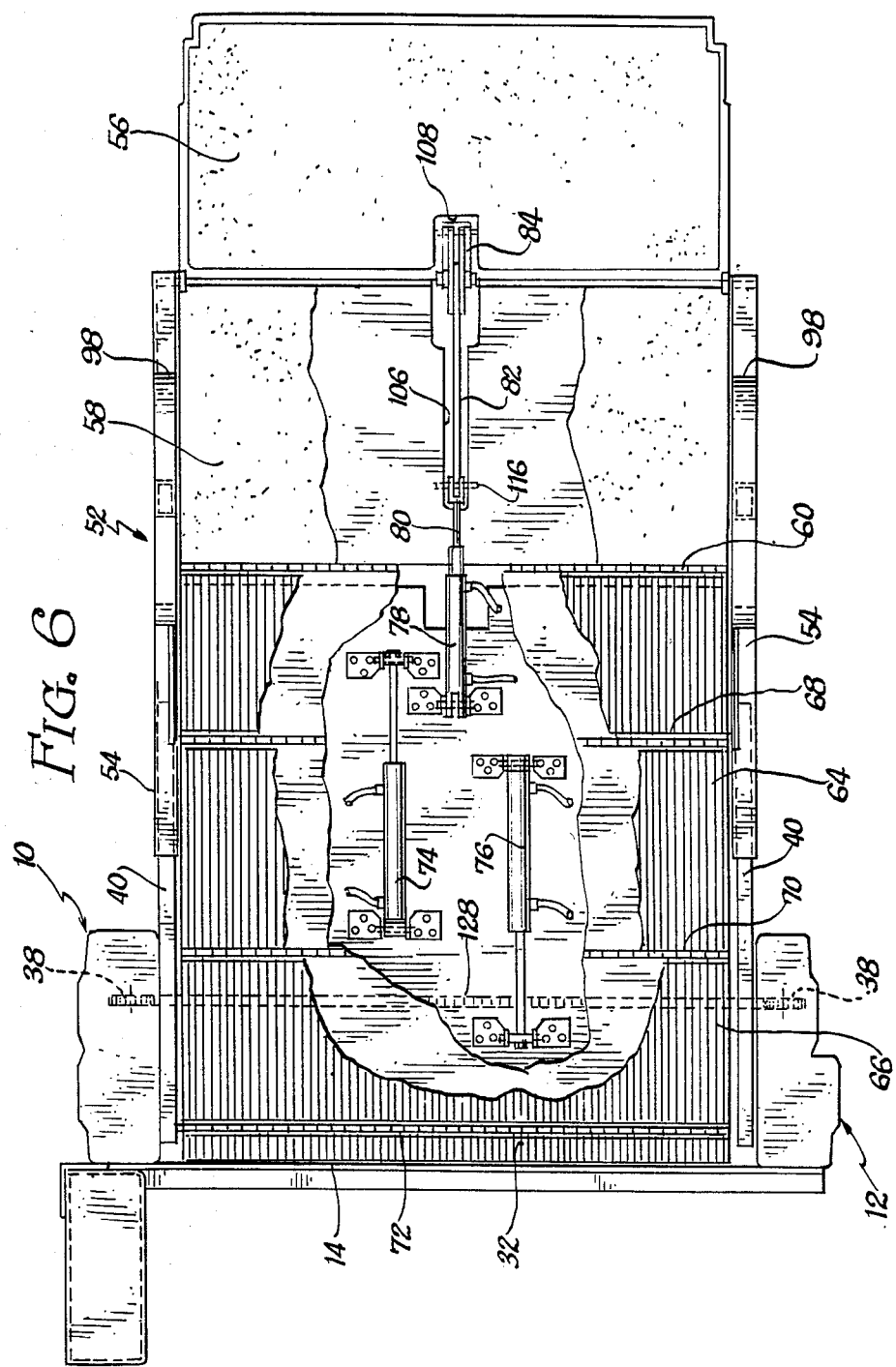

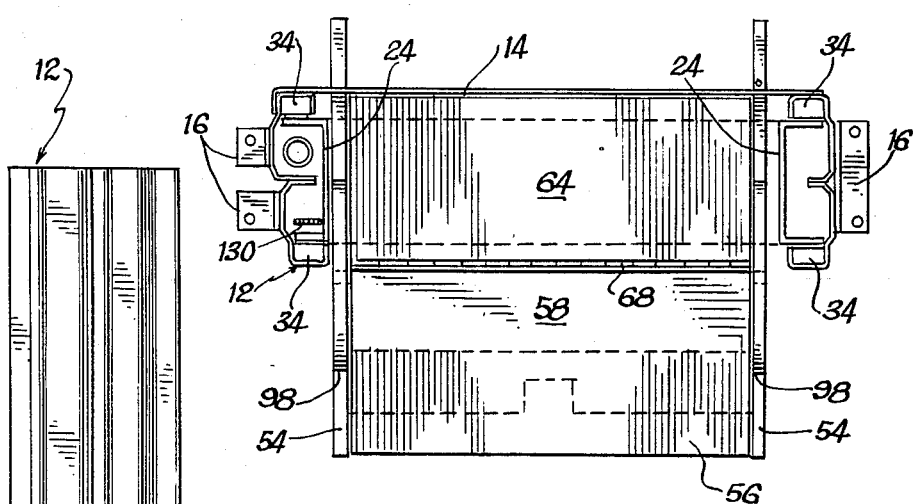
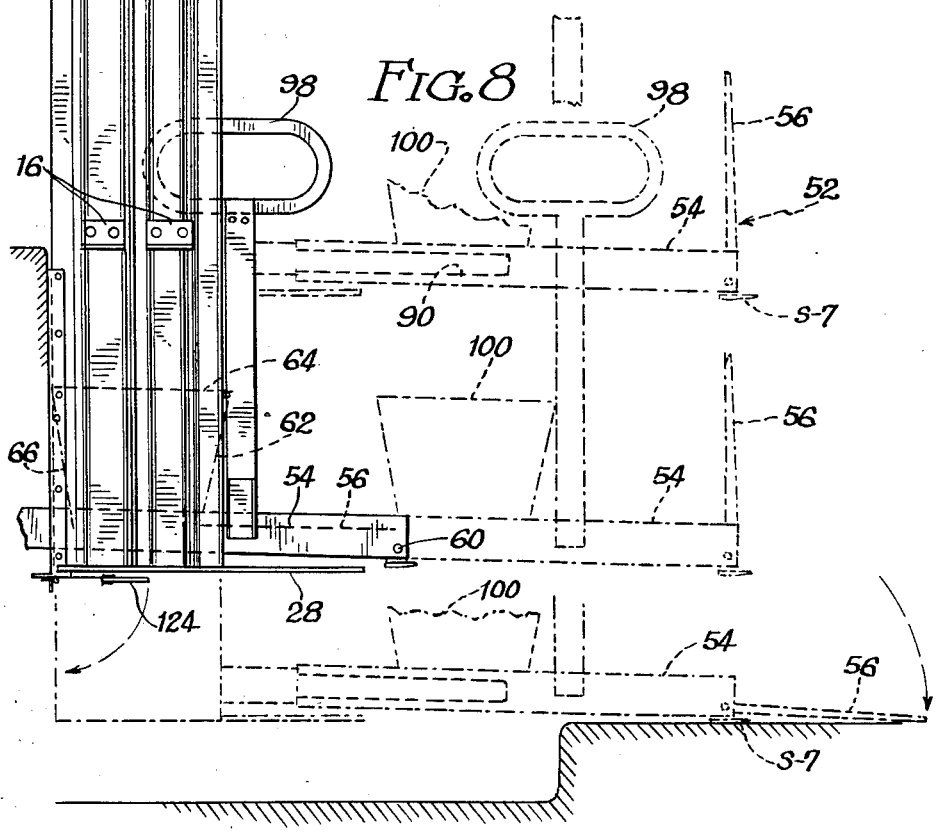

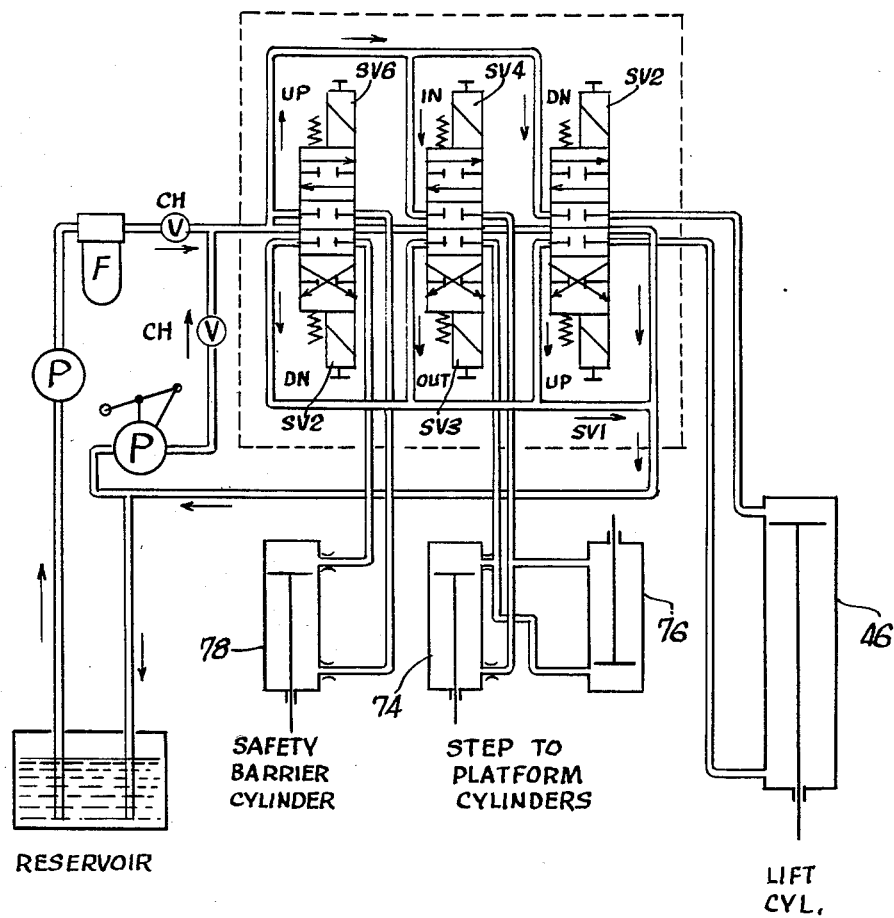

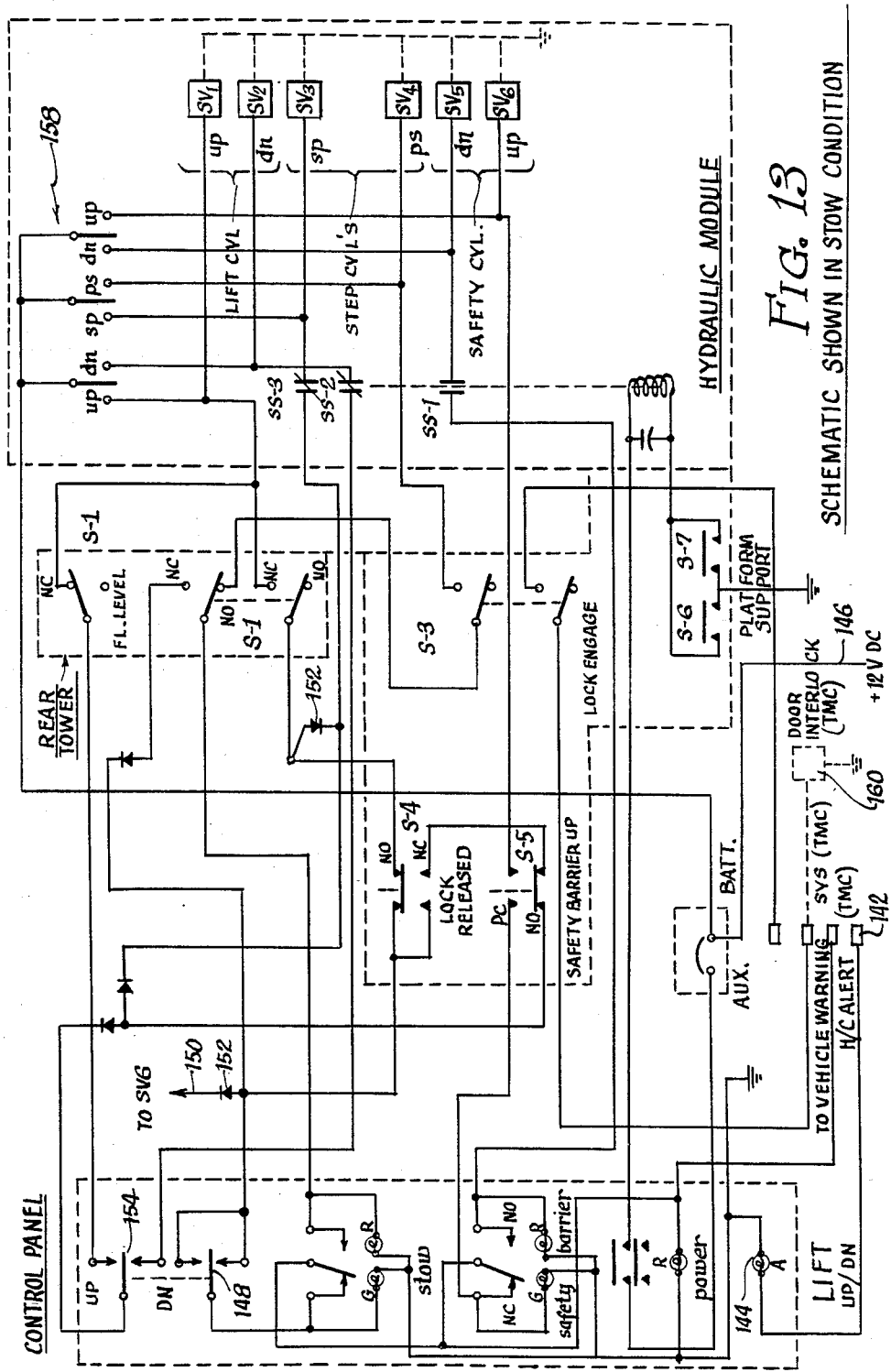

WHEELCHAIR LIFT

CROSS-REFERENCES TO RELATED APPLICATIONS

This application is a divisional application of Ser. No. 268,466 filed May 29, 1981; which is a continuation-in-part of PCT US 80/00112 filed Feb. 23, 1980; which is a continuation-in-part of Ser. No. 041,943 filed May 24, 1979 now U.S. Pat. No. 4,251,179 issued Feb. 17, 1981; which is a continuation-in-part of Ser. No. 885,714 filed Mar. 13, 1978 now U.S. Pat. No. 4,176,999 issued Dec. 12, 1979; which is a continuation-in-part of Ser. No. 769,636 filed Feb. 17, 1977 now U.S. Pat. No. 4,081,091 issued Mar. 28, 1978; which is a continuation-in-part of Ser. No. 606,137 filed Aug. 20, 1975 now U.S. Pat. No. 4,027,807 issued June 7, 1977.

BACKGROUND OF THE INVENTION

The invention falls within the general field of adaptations made to public facilities so that they may be used, or more conveniently used, by the handicapped, and more particularly those restricted to a wheelchair. Following the direction of this general trend, and at the prodding of federal government regulations, new buses must be provided with, and existing busses must be retrofitted with, some means of permitting use of the busses by wheelchair victims.

Over the years, different lift mechanisms have been developed to raise and lower wheelchairs, but many of these require the dedication of space, which could otherwise be used for seated passengers, to the lift mechanism. To the already financially strapped transit companies in urban transit areas, this type of lift is not popular. Especially during peak load times, transit operators do not want to lose additional revenue from diminished seating capacity because of spatially inefficient lifts in addition to seating capacity already lost by the inevitable occupation of more floor space by a wheelchair than by a normal passenger seat.

For this reason, transit operators and others have turned to lift mechanisms which, by virtue of converting existing stairwells alternately between stairs and lift platforms, require no additional space for their implementation. The present application, in fact, is a continuation-in-part of Patent Cooperation Treaty Application No. 80/00112, filed Feb. 23, 1980, with the United States being a designated country. The PCT application was, in fact, a continuation-in-part of U.S. Pat. No. 4,251,179 issued Feb. 17, 1981. Predecessors of that patent include U.S. Pat. No. 4,176,999 issued Dec. 4, 1979, U.S. Pat. No. 4,081,091 issued Mar. 28, 1978, and U.S. Pat. No. 4,027,807 issued June 7, 1977. This series of applications sets forth wheelchair lift technology which increases incrementally in simplification, practicality and safety, and to which line of development the present application represents the latest steps.

The basic mechanical functions of the predecessor wheelchair lift as disclosed in the parent application of this case have been carried forward to the instant device. The general technique of expanding the step panels into a flat platform by the use of hydraulics is retained, but by utilizing a novel crossed-cylinder hydraulic deployment system with a simplified slide structure, coupled with other complementary modifications, the weight of the prior device has been cut by 30% and the number of parts slashed by 60% to produce a unit which is significantly simpler, less subject to maintenance requirements, and is also safer and stabler in operation.

SUMMARY OF THE INVENTION

The prior art mechanism used a sliding parallelogram structured to maintain the horizontal step panel horizontal as it was lowered into the platform position. This required a number of sliding couplings between brace and frame structure, and in addition a long double hydraulic cylinder was used to extend the platform. To obtain a further length of extension of the platform, the lowermost surface in the step mode had beneath it an underlying surface which extended outwardly when the platform was deployed. To obtain this length, a file cabined drawer-type slide support assembly was used, which added to the number of parts and complexity of the extension assembly and reduced its strength.

In the present invention, all of the support structure for the step itself has been replaced with two hydraulic cylinders, both of which mount at one end to the horizontal step panel, and the other ends of which attach to the riser panel and back panel of the step, respectively. Simultaneous deployment of these two cylinders through a flow control unit insures the even, parallel lowering of the step panel without a parallelogram structure. In reverse, whereas before a "kicker" lever was required to buckle this step panel at the outset of step formation, the dual crossed cylinder deployment technique eliminates this part as a feature inherent in the geometry of the necessarily offset cylinder mounting brackets which extend from the step panels.

An additional and substantial improvement lies in the safety barrier and the novel technique of deploying it. Previously, a small safety barrier was actuated by dual cylinders to pivot up from a few inches inward of the outermost platform leaf. This barrier, compared to the present innovation, was too short, failed to utilize all of the platform space for the wheelchair, and utilized too many parts to operate. The present safety barrier is hinged to the outer edge of the outermost portion of the platform and pivots outwardly into its upright position for deployment rather than inwardly, and utilizes a combination mechanical-hydraulic actuator described in detail below which causes the automatic erection of the barrier concomitantly and as an inevitable result of the forming of the step panels into a platform.

Several other novel features include a key on the inner side of the horizontally traversing carriage which locks in an opening in the mechanism frame when in stow position to prevent vertical movement, and a hydraulic detent which securely locks this key into position to prevent accidental jostling loose of the mechanism in transit. Another feature is a chain sling stabilizing mechanism designed to prevent twisting or tilting of the horizontal deployment mechanism relative to the elevator assembly in which it is mounted. New circuitry, hydraulic sequencing, safety sensors and other features are set forth in the detailed description which follows below.

BRIEF DESCRIPTION OF THE DRAWINGS

FIG. 3 is a section taken vertically through the device similar to FIG. 2 but with the carriage extended into the platform mode;

FIG. 4 is a vertical section similar to that of FIG. 3 but looking the opposite direction;

FIG. 5 is a detail of the section in FIG. 4 but with the safety barrier lowered;

FIG. 6 is a top elevation view of the platform when fully extended with portions cut away to illustrate the hydraulic and mechanical deployment mechanism;

FIG. 7 is a top elevation view of the step structure with the towers being diagrammatically illustrated;

FIG. 8 is a diagrammatic view from the right side of the lift indicating its vertical movement capability;

FIG. 12 is a schematic of the hydraulics of the system; and

FIG. 13 is an electrical schematic diagram of the lift circuitry.

DETAILED DESCRIPTION OF THE PREFERRED EMBODIMENT

For simplicity of understanding, certain details of construction which are either obvious from the drawings, or are obvious from prior applications wherein these details are both illustrated and described, this description will be set forth functionally and somewhat summarily, and all disclosure pertaining to similar structure detailed in prior patents of this sequence, and the parent application, are hereby incorporated by reference into the instant application.

Figure 1:
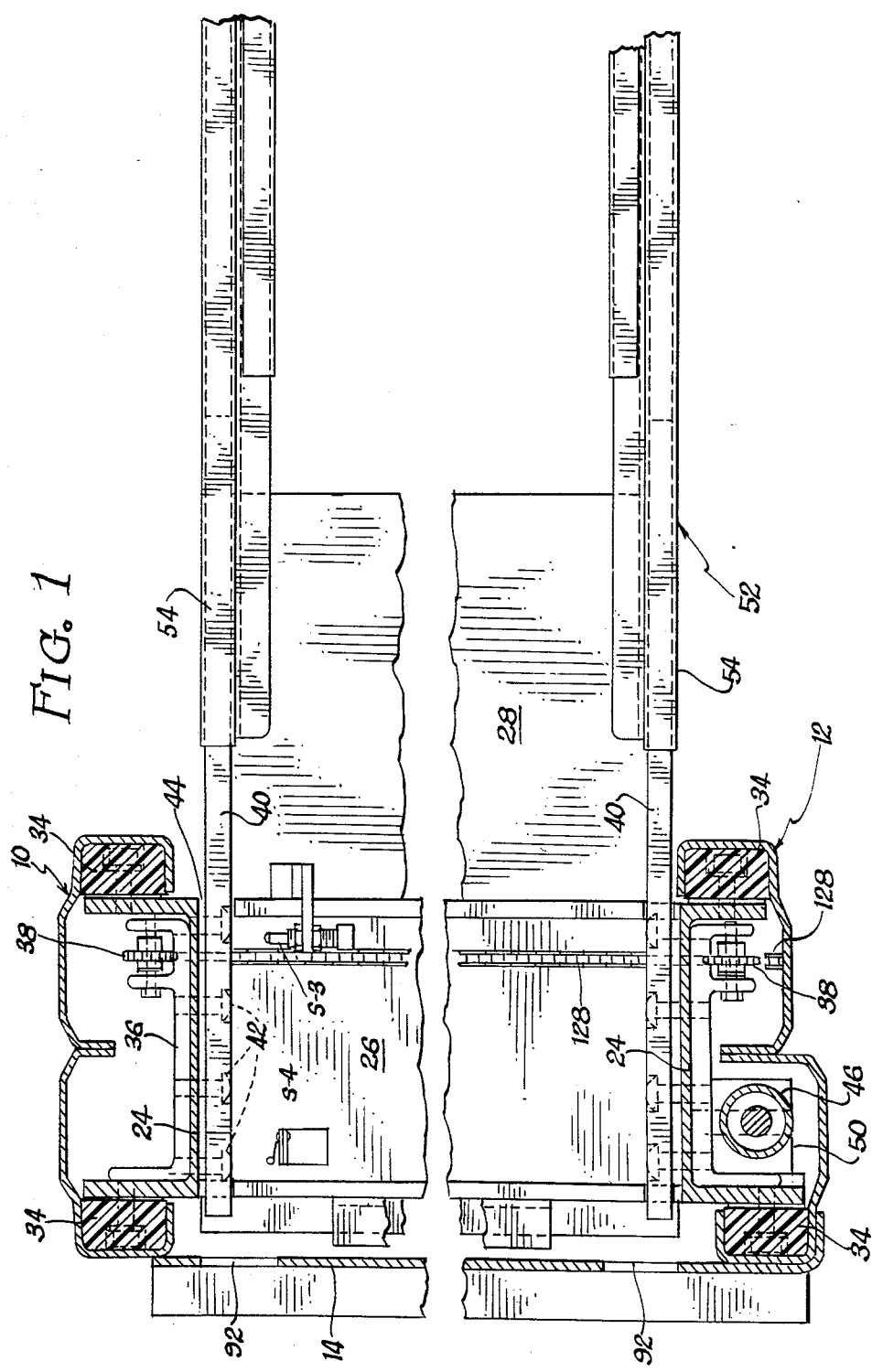
FIG. 1 is a horizontal section taken through the towers and showing the frame structure with the step and platform panels removed.
Figure 2:
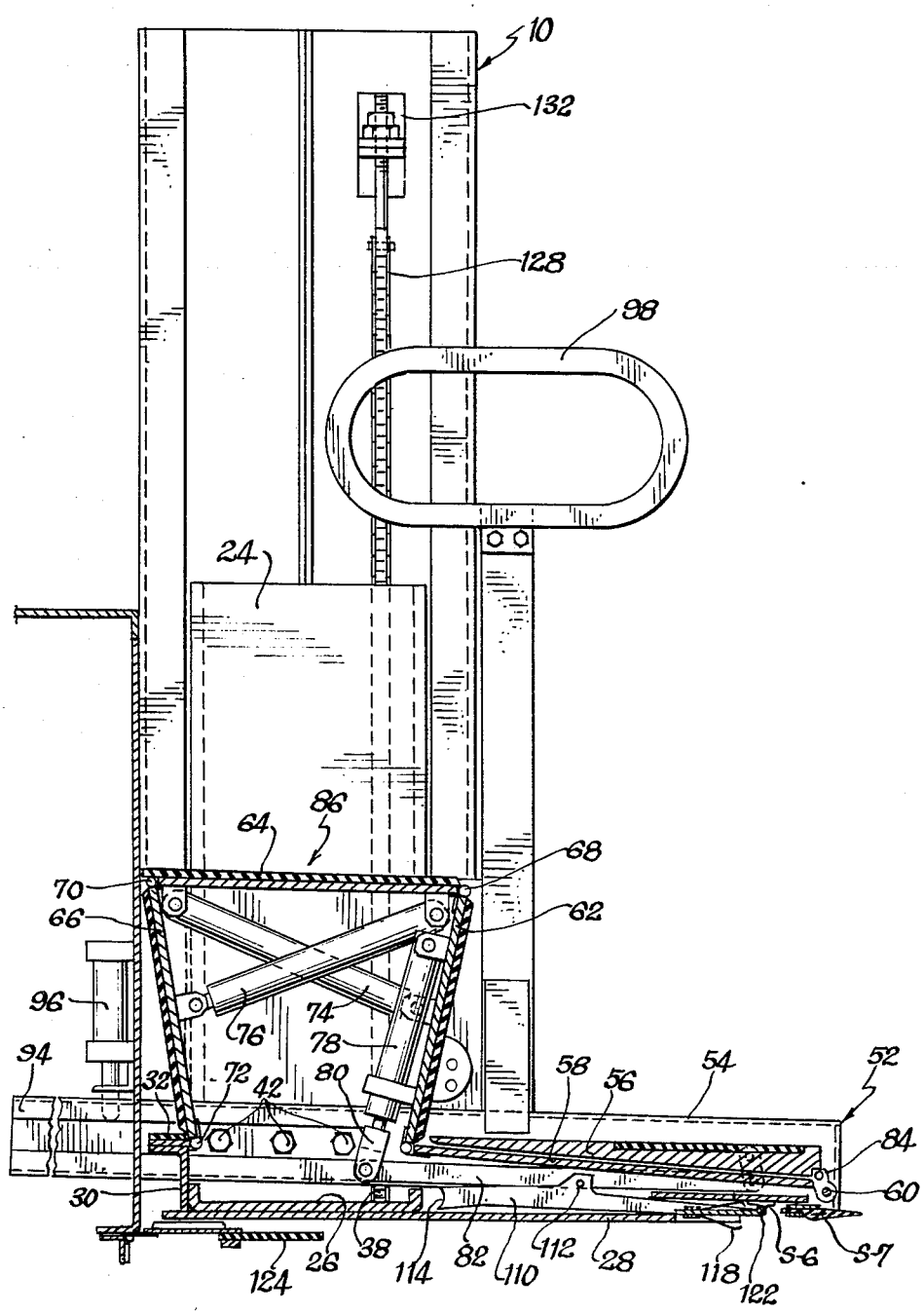
FIG. 2 is a vertical section taken through the device in its step mode illustrating the crossed deployment cylinders and folded safety barrier mechanism.
Figure 9:
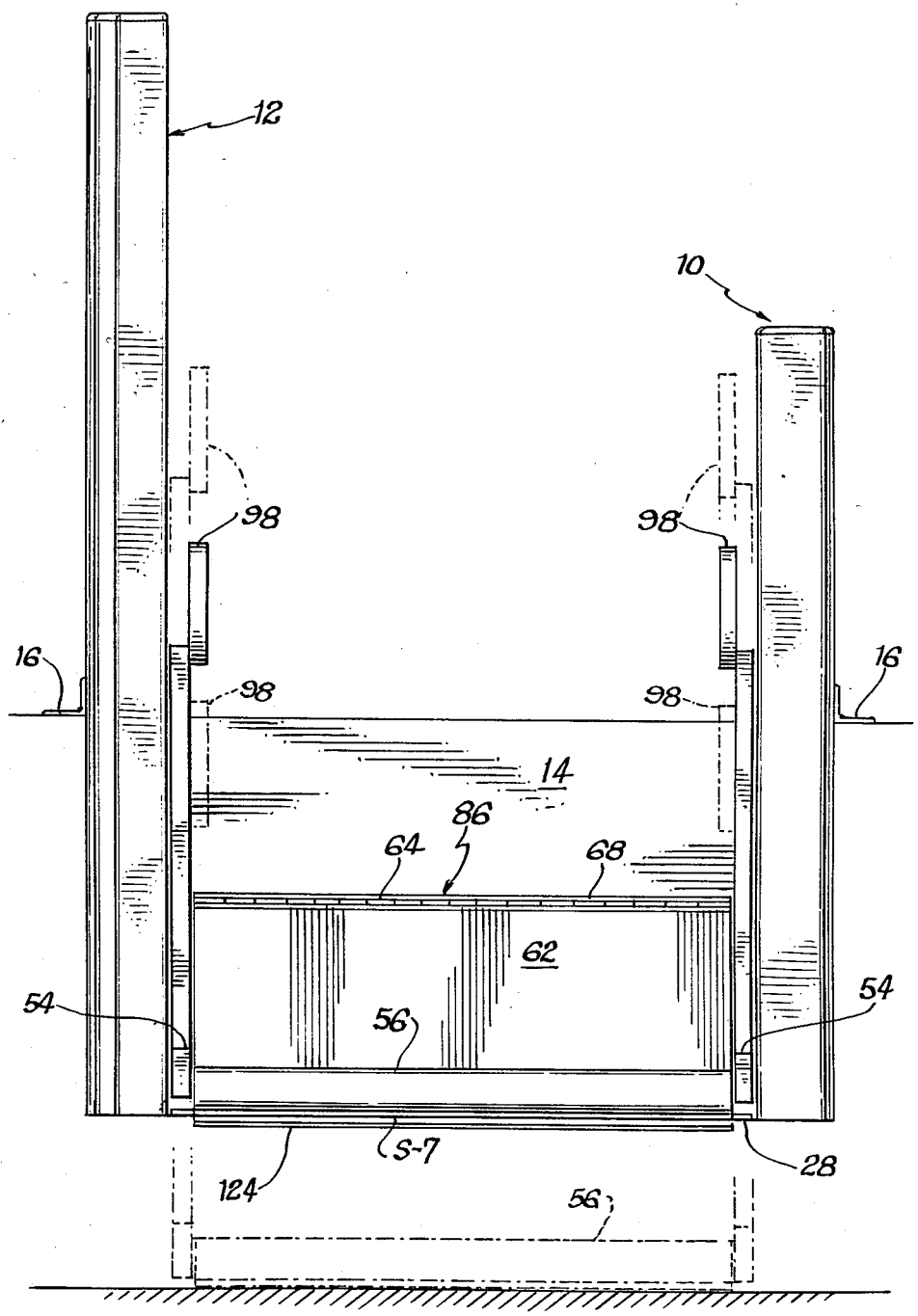
FIG. 9 is a front elevation view, diagrammatically presented, of the sequence shown in FIG. 8.

The basic stationary frame structure of the lift which is also the frame for the elevator assembly is quite simple and can be seen in its entirety in FIGS. 1 and 2. Two vertical towers, a front tower 10 and a rear tower 12, each is defined by a specialized channel beam of the shape illustrated in FIG. 2 and the two beams are connected together by a back facing plate 14. This structure, essentially a pair of tracks with a planar backing, is mounted upright in the stairwell of a bus by flanges 16 (shown in FIG. 9) or other suitable structure which supports the frame from the vehicle frame structure.

Within the above fixed structure and riding between the front and rear towers 10 and 12 is an elevator assembly which in turn supports a frame supporting a horizontal extension assembly. The essence of the elevator assembly is the pair of outwardly directed upright channel beams 24 which are welded or bolted to the cross bottom beam 26 as shown in FIG. 2. A cover plate 28 is fastened to the underside of the cross beam 26, and the cover plate and cross beam together mount a flange 30 which seats a thin platform strip 32.

Up and down motion of the channel beams within the towers is facilitated by elongated bearing blocks 34 mounted to the sides of the channel beams. These blocks ride freely in the outer lobes defined by the towers. The structure indicated at 36 is a reinforcement plate welded to the bottom few inches only of the upright channel beams 24, and these reinforcing welds define journalled bracket mounts for lower sprockets 38 which are part of the chain stabilizing sling described below and illustrated in FIG. 11.

The U-shaped member defined by the upright beams 24 and the cross member 26 is thus free to move up and down within the towers 10 and 12 which act as track members. Mounted to the insides of the channels at the bottom are a pair of outwardly extended rail members 40 which are shaped much like a railroad track, with a relatively thin webbed center so that the heads of mounting bolts 42 do not extend beyond the rail as indicated in FIG. 1, and spacer strips 44 are used to define a space between the upright channels 24 and the rails so that the slides of the carriage assembly, described below, may pass over the portion of the rails which are bolted to the channel beams. The bolts pass through the reinforced sections 36 of the channels.

A double-acting hydraulic cylinder 46, shown in FIG. 4, is connected to the rear tower 12 at 48 and to the bottom of the rear channel beam 24 at 50. In the sequence described below, this cylinder acts to raise and lower the structure which supports the horizontal extension assembly described below. The horizontal extension mechanism is based on a carriage 52 which is best seen in overall perspective in FIG. 8 in phantom. The carriage has a pair of slides 54 that ride on the rails 40 and enable the entire carriage to slide the full throw of the extension of the platform. At the end of the carriage is a safety barrier 56 which pivots down into stored position as indicated in FIG. 2 against the carriage surface or stage 58. The inner end of the carriage stage has a hinge 60 which mounts the outermost of a series of articulated panels which are hinged together at 68 and 70 to define the riser panel 62, the step panel 64, and the back panel 66, respectively, the back panel being hinged down at 72 to the platform strip 32 which is securely mounted to the horizontal extension support frame.

Each of the panels indicated is made from a rigid backing of metal and a coating of treadable rubber. The top surface of the stage 58 and the operative surface of the barrier 56, both of which together define a ramp when the safety barrier is extended, are covered with a non-skid material, not shown.

The basic mechanism of extending the carriage from the step mode to the platform mode can best be understood by reference to FIGS. 2 and 3. A pair of extension cylinders 74 and 76 are pivoted between panel 64 and 62, and panel 64 and 66, respectively, as illustrated. Because the lower edge of the back panel 66 is secured against other than pivotal motion by the hinge 72, and the lower edge of the panel 62 is restricted from other than horizontal extensor type motion, expansion of the cylinders 74 and 76 will in fact cause the extension of the platform into the orientation shown in FIG. 3, including the automatic righting of the safety barrier as indicated in FIG. 3.

Figure 10:
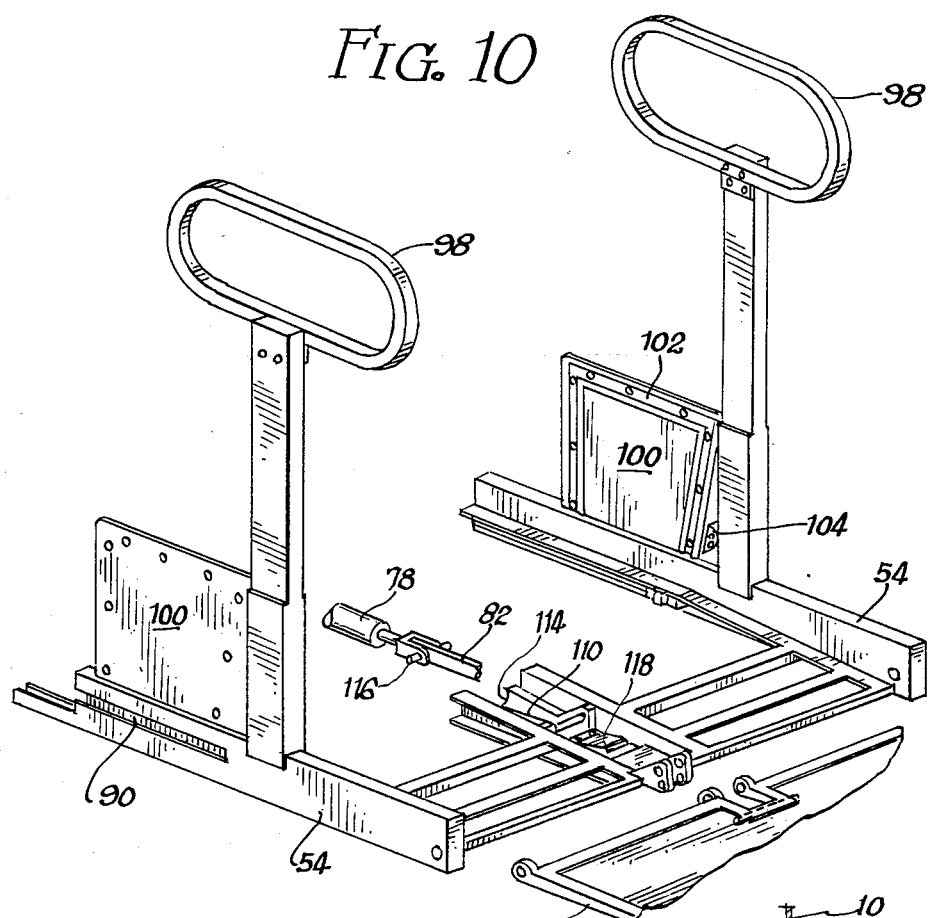
FIG. 10 is a perspective view detailing the safety barrier mechanism.

The latter motion is effected by virtue of a third hydraulic cylinder 78, which is rigidly mounted to the rear surface of the panel 62 with its extending piston rod 80 depending below the junction point between panel 62 and the stage 58. Because this piston or plunger rod is pivoted to an actuator rod 82 which couples to the safety barrier through a linkage mechanism 84 as best illustrated in FIGS. 2, 3, and 10, an automatic righting of the barrier into the upright position follows from the flattening of the step, generally indicated at 86, when it folds into its platform mode, generally indicated at 88. This occurs without any hydraulic expansion of the cylinder 78, and further expansion, which can only occur when the platform is fully extended, causes the safety barrier to extend into its ramp mode connecting to the sidewalk as shown in FIG. 5.

Turning to some of the details of construction of the carriage 52 and related structure, the carriage slides 54 are cut away as indicated at 90, on their outsides, to pass over the spacer strips 44. This enables the full length of the slide to be used, and one or both slides may be long enough to pass through one or two apertures 92 and the back plate 14 to act as a key engaged in a slot as indicated at 94 in FIG. 2. Because the plate 14 is fixed relative to the vehicle, engagement of the keyed end of one or both slides assures that when the lift is in its step or stow mode, which is the only mode in which the keying will function, there is no drifting of the mechanism downward due to fluid expansion or hydraulic seepage. The further insure that the key stays in the keyway, a negative action detent cylinder 96 could be mounted to the back of the plate to engage a hole in the key 94 when it is in locked position, the cylinder 96 being actuated by the release of hydraulic pressure which would occur when the system is shut off, and being disengaged from the slide when the system is actuated and under pressure.

Other features of the carriage and its slides are the upright handrails 98 with the oval gripping portion. These handrails stand up from the slides and move in and out near the end of the platform and serve the obvious function of helping a wheelchair victim move onto or off of the platform from the sidewalk. Immediately inwardly of the handrail support post, on each side, is an end plate 100 which has a stair seal strip 102 on its inner surface and a stair forming block 104, so that as the platform is stowed back into the step mode as indicated in FIG. 2, the ends of the step 86 would be covered and somewhat sealed, and the bumper 104 would urge riser panel 62 back into its proper position.

Turning now to the details pertinent to the end of the platform, as can be seen in FIG. 6 the stage 58 has a central slot 106 in the outer portion thereof to permit passage therethrough of the actuator rod 82 whose operation has already been generally described. FIG. 3 illustrates the necessity of this slot, and in operation this slot would be ordinarily covered by a pair of rubber lips for sealing purposes which are parted by the actuating rod. The inward end of the safety barrier is also cut away at 108 to make room for the linkage 84.

An additional feature of the end of the platform is a mechanical failsafe 110 pivoted at 112 centrally in the carriage structure. Operation of the failsafe is shown in FIG. 4, a notched shank 114 of the failsafe lever blocks progress of the coupling pin 16 which couples the rod 82 to the rod 80, when the lever is permitted to fall in its natural position, as illustrated. The coupling pin is freed only upon touching of the spring sensor 118 to the curb or other horizontal surface, pushing the outer end of the lever up. An upper spring 120 prevents the lever from jostling upward when the bottom spring has not touched ground, and a lobe 122 triggers pressure switch S6 when ground contact has been made. Switch S7 is a strip switch which passes across the entire width of the end of the carriage and is actuated upon the touching of any point on the switch. The functioning of switches S6 and S7 in the circuit will be described during the description of the circuit illustrated in FIG. 13.

Still with reference to FIG. 4, another feature of the invention is the spring-loaded flap 124 shown at the bottom of the back plate 14. This flap is hinged to the bottom of the back plate, and is flipped vertically when bottom cover 28 strikes it. The purpose of the flap is to prevent entry of objects beneath the back plate 14, such as toes, which could become sheared off when the platform raises.

Figure 11:
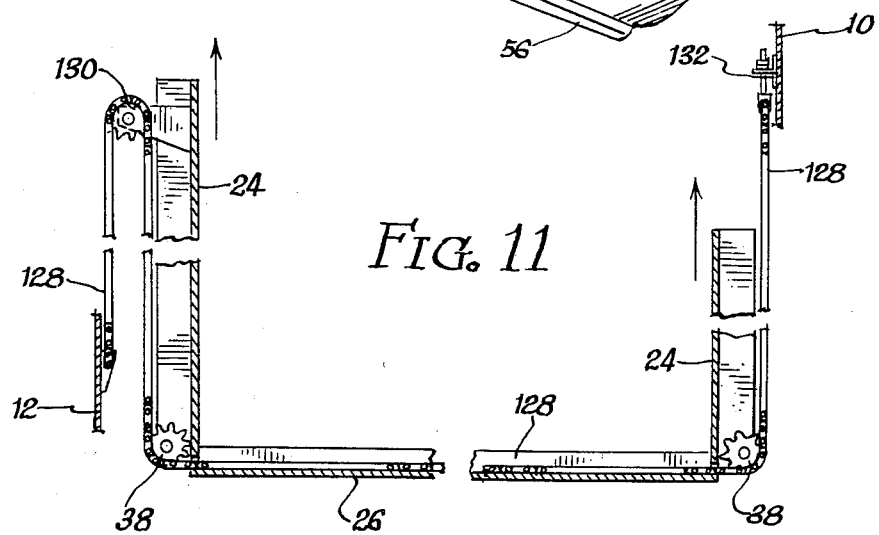
FIG. 11 is a diagrammatic illustration of the chain sling support mechanism.

FIG. 11 further illustrates the chain alluded to above. The effect of the chain is to stabilize the system and prevent one side of the carriage from lowering faster than the other, or from jiggling up and down. The chain sling begins by its attachment at 126 to the rear terminal where the chain 128 extends upwardly, over a sprocket 130 and down around the two lower sprockets 38, and terminates at an adjustable connection 132. Play in the chain acquired over time can be taken up by the proper adjustment at 132.

Turning to the hydraulic functioning of the system, FIG. 12 illustrates diagrammatically the hydraulic circuit. Solenoid valves SV6 and SV7 selectably raise or lower safety barrier cylinder 78, SV4 and SV3 control platform cylinders 74 and 76, and SV2 and SV1 operate lift cylinder 46. This schematic illustrates the hydraulic power routing to the respective cylinders, and the sequencing and actual control is described with reference to FIG. 13.

In operation, turning to FIG. 13, basic control of the system is accomplished from a panel at the vehicle operator's disposal. In essence, the control panel is provided with four switches, a safety switch 134, an up-down safety barrier switch 136, stow switch 138 and lift switch 140. In general operation, the driver would be operating with the lift in its stow or step mode. A wheelchair user signals his desire to exit the bus by pressing continuous pressure switch 142 which actuates Handicapped Alert light 144 on the control panel. Alternatively, the driver sees that at his next stop a wheelchair victim waits on the sidewalk for the bus.

Once stopped with the door open, a switch, which is not shown but is actuated by the opening of the door, enables the entire lift mechanism. At this point the driver activates the system with the power switch 134 and selects either the up or down position with the lift switch 140. Because the STOW switch 138 is not hit simultaneously with the up switch, power is provided from the power source 146 through the stow switch to the lower pole 148 of the lift switch 140. This power is immediately applied to SV6 at bypass 150, and as shown at the right of FIG. 13 (and can be cross referenced in FIG. 12) SV6 is the "up" solenoid valve of the safety barrier. This valve causes the safety barrier to be driven from the extended position of FIG. 5 to the upright position of FIG. 4. However, the safety barrier switch S5, which is not shown in the drawings, is actuated by the safety barrier cylinder 78 when this cylinder is withdrawn, disenabling solenoid valve SV6 when the safety barrier is either upright as in FIG. 4, or folded back as in FIG. 2, both positions representing full withdrawal of the safety barrier cylinder 78. Thus, to follow the operational sequence started above, because the safety barrier is already up, normally closed switch S5 is open and solenoid valve SV6 is not affected.

Following the circuit from the lower pole 148, power is passed down to the lock release switch S4, which is shown, together with lock engage switch S3, in FIG. 1. The lock release switch is normally closed when the slide 54 has extended outwardly sufficiently to clear the apertures 92. This prevents vertical motion of the assembly when this slide is locked in place. Since ordinarily the slide would, in fact, be locked and the lock release would have the normally open pair of contacts closed, current would pass through diode 152, actuating solenoid valve S3 and extending the platform. Diverting briefly to switch S2, which is the stow level switch shown in FIG. 4, if the lock released switch S4 has not been released and switch S2 is closed, indicating the carriage has fallen off of the proper stowage height, solenoid valve SV1 will actuate the lift cylinder until the stow level switch S2 is triggered, opening the circuit to the lift cylinder. However, power would still be provided to SV3 through diode 152 until the lock released switch S4 is released, opening the top terminal pair and closing the bottom terminal pair. The safety barrier switch S5, which is already triggered, passes current up to the upper toggle 154 of the switch 140, which actuates the up or down lift solenoid valve, depending on whether the operator wants to unload, or load on, a wheelchair. The toggle 154 in the down position passes straight through to the solenoid valve, and in the up position does the same to the up solenoid valve, provided the limit switch S1, which indicates the platform is level with the bus floor, has not been triggered.

It should be noted that throughout all of the above operating sequence, regardless of whether the up or down position of the switch 140 has been selected, the step-toplatform valve SV3 is continuously operational. There is no limit switch on the outer travel of the carriage, which is limited by being extended to full length.

Assuming a wheelchair is to be off-loaded, switch 140 would have been put in the up position, and the step would have extended to a platform while simultaneously raising to the floor level of the bus, at which time switch S1 would deactuate the lift cylinder. The safety barrier is in its upright position. When the wheelchair is rolled onto the platform, the platform is lowered with switch 140 until it touches a curb or other object, at which point either one or both of the switches S6 and S7, corresponding to the switch on the failsafe lever and the strip switch at the tip of the platform, is actuated, actuating solenoid 156. The solenoid actuates solenoid switches SS1, SS2 and SS3.

Switch SS1 normally prohibits operation of the lowering mode of the safety barrier, while switches S2 and S3 normally enable the step-to-platform extension mode and the down mode of the lift. All of these functions are reversed by the solenoid so that the lift can no longer travel or downward but only upward and inward, and the safety barrier may be lowered. It will be noted that it is an absolute requirement that one of the sensor switches S6 or S7 be actuated before the safety barrier can be lowered, aside from a manual override which may be incorporated in the system as described below.

Once the lift, and platform mode and been lowered to the curb and the safety barrier released, the wheelchair operator may propel himself onto the sidewalk, subsequent to which the operator wants to withdraw the lift into its stow, or step mode. Although the operator could directly raise the safety barrier by operation of switch 136 which is now operational because switch S4 is in the normally closed mode, directly connecting the solenoid valve, this is not necessary. The ordinary stow sequence involves simultaneously pushing stow button 138 with either the up or down position of switch 140 being pressed.

The path of current to toggle 154 of switch 140 is different in stow mode than in the deploy mode. It comes from switch 138 and passes through switch S2, which is in the elevated pole position because the ramp is not at the stowing level, but is below it (under normal circumstances). This switch passes the power to the junction just beneath diode 150, where it passes through 150 and through the safety barrier up switch S5 to operate solenoid SV6. Power to control switch 140 is not available until the safety barrier comes up, reversing the position S5 and passing power from the junction below diode 150 through switch S4, S5 and directly up to 140. As the lift raises by direct action of the solenoid valve powered through the switch 140, it will reach the stow level, which will trigger switch S2, flipping the upper toggle from the up position down, which de-energizes the lift solenoid valve and energizes solenoid valve SV4 through switch S3, which is closed because the lock is not, in fact, engaged. At this point, withdrawal of the lift into step mode is the only function that occurs. As detailed in the mechanical description, the safety barrier automatically folds into place as the platform metamorphoses into a step. When the platform has completely undergone this transistion, the rail lock switch S3 will be actuated, opening the circuit to SV4, and the cycle is complete.

This cycle covers virtually all functions of the lift, except perhaps for elevation to a curb which brings platform above stow level, and possibly a couple of other instances which call for operations the sequencing of which should be clear from the above indicated operation description. Other features of FIG. 13 not yet touched upon are the manual override switches 158, which are an optional feature, and the door interlock 160 which powers a solenoid that prevents closing of the door while the lift is in other than the completely stowed position. The detailed description of the electronic components of the circuit has been omitted as surplusage, as the above description makes it clear the circuit will make the system operational, and an analysis of the diagram of FIG. 13 will yield all functional facts required.

As thus described and claimed, the invention does not represent a breakthrough in technology to the extent of former embodiments, but does set forth substantial and significant improvements which come in an area in which they are sorely needed. Transit companies are caught in a triple squeeze between the legitimate need of handicapped to become more mobile, coupled with enforcing government regulations to insure that they do, and the public, on the other hand, wanting more space, more modern busses and low transit costs, and thirdly the bus company's own financial position. The regulations force the company to acquire lifts, complying with the regulations enables the company to get federal money, but installation of the lifts is expensive and also reduces the number of other passenger seats, increases maintenance costs and otherwise proves counterproductive to the other legitimate goals of the transit company.

Thus, the instant invention, which simplifies the lift structure and reduces maintenance by reducing the number of moving parts and the complexity generally while simultaneously reducing cost of construction, and which also improves the safety, strength, ease of use, and even appearance of the lift, represents an extremely welcome set of improvements over the predecessor chair lift.

While I have described the preferred embodiment of the invention, other embodiments may be devised and different uses may be achieved without departing from the spirit and scope of the appended claims.

What is claimed is:

1. A lift assembly commuting between an upper level and a lower level alternatively as a stair or as a vertically adjustable platform, said lift assembly comprising:
   (a) an elevator assembly;
   (b) a horizontal extension frame for supporting a horizontal extension assembly, said frame being mounted on said elevator assembly for vertical movements;
   (c) a plurality of articulate panels defining said stair and extensible as part of a platform;
   (d) the panel which is outermost when extended having a safety barrier pivoted substantially at the outer edge thereof and being pivotal from an inwardly directed mode folded against said outermost panel acting as a part of said stairs, through an upright position effectively deployed as a safety barrier, to an outwardly extended position defining a ramp continuation of said outermost panel; and wherein said outermost panel is hinged on the edge opposite the edge mounting said safety barrier to a panel acting as the riser panel of a step of said stair, and said riser has a projecting rod extending down beneath said outermost panel when in said stair mode, and including an actuator rod and a pivotal linkage on said safety barrier such that upon deployment of said panels as a platform, said extending rod forces said actuator rod to pivot said safety barrier into the upright position.

2. A lift according to claim 1 wherein said actuator rod extends from a hydraulic cylinder mounted on the rear surface of said riser panel and deploys generally horizontally therewith when actuated to further pivot said safety barrier into fully deployed platform mode.

3. A lift assembly according to claim 1 wherein
   (a) an elevator assembly having a fixed frame;
   (b) a platform frame for supporting a horizontal extension assembly, said platform frame being mounted for powered vertical movement on said elevator frame; horizontally spaced lower sprockets at the sides of a lower portion thereof, and an elevated sprocket mounted to one side near the top of said frame; and
   (d) a stabilizing support chain mounted at one end to a lower fastening point on said elevator assembly below said elevated sprocket and passing over said elevated sprocket, then passing down from said elevated sprocket, across the bottoms of said lower sprockets, and extended to an elevated fastening point on the opposite side of said elevator assembly from said lower fastening point.

4. A lift assembly according to claim 1 wherein said safety barrier includes a mechanical failsafe device moveable relative to said frame by a surface underlying said lift assembly, as said frame descends from a position blocking said actuator to prevent premature deployment thereof to a position freeing said actuator when said horizontal extension assembly is in low enough position for safe ramp deployment.

5. A lift assembly according to claim 1 and including a tactile strip switch along a distal edge of said outermost panel for disenabling further deployment of said lift assembly when actuated.

6. A lift assembly according to claim 1 and including a disenabling switch for disenabling vertical motion of said frame on said elevator assembly when said lift barrier is not in the upright position.

* * * * *